United States Patent [19]

Ichinose

[11] 4,433,759

[45] Feb. 28, 1984

[54] GAS SPRING

[75] Inventor: Hisao Ichinose, Yokohama, Japan

[73] Assignee: Nissan Motor Co. Ltd., Yokohama, Japan

[21] Appl. No.: 289,858

[22] Filed: Aug. 4, 1981

[30] Foreign Application Priority Data

Sep. 11, 1980 [JP] Japan ............................. 55-129573

[51] Int. Cl.³ .............................................. F16F 9/19
[52] U.S. Cl. ....................................... 188/282; 16/51; 188/322.15
[58] Field of Search ............... 16/51, 52; 188/280, 188/281, 282, 284, 286, 318, 322.15; 267/64.12, 124

[56] References Cited

U.S. PATENT DOCUMENTS 3,882,977  5/1975  Watanabe ............................ 188/282
4,106,596  8/1978  Hausmann ........................... 188/267
4,185,356  1/1980  Kuivalainen et al. .......... 188/282 X

FOREIGN PATENT DOCUMENTS 2653552  6/1978  Fed. Rep. of Germany .
2659491  7/1978  Fed. Rep. of Germany .
1061567  3/1967  United Kingdom .
1554896  10/1979  United Kingdom .
1566928  5/1980  United Kingdom .
1592483  7/1982  United Kingdom .

Primary Examiner—Duane A. Reger
Attorney, Agent, or Firm—James Creighton Wray

[57] ABSTRACT

A gas spring for a hatch type door is disclosed, which comprises a cylinder, a piston received in the cylinder to divide the same into first and second chambers, a piston rod connected to the piston, a first device for providing a passage between the first and second chambers only when the piston moves in a direction to contract the second chamber, a second device for providing a passage between these chambers only when the piston rod is pushed against the piston by a force greater than a predetermined degree, and a third device for providing a passage between these chambers only when the piston is positioned within a predetermined area in the cylinder.

14 Claims, 7 Drawing Figures

GAS SPRING

BACKGROUND OF THE INVENTION

1. Field of the Invention

The present invention relates in general to a gas spring, and more particularly to a gas spring which is applied to a hatch type door of a vehicle for keeping the door opened unless an external force to close the door is applied thereto.

2. Description of the Prior Art

In order to keep the hatch type door opened against the weight of the door itself, there has been proposed a telescopically movable gas spring which generally comprises a cylinder body pivotally connected to the vehicle body, a free-piston sealingly and slidably disposed in the cylinder body to divide it into a gas chamber and a liquid chamber, a main piston slidably disposed in the liquid chamber to divide it into first and second liquid chamber sections which are communicated with each other by only an orifice formed in the main piston, and a piston rod secured at its one end to the main piston and projecting axially from the cylinder body, the other end of the rod being pivotally connected to the door. When the door is under manual opening operation and the opening movement of its exceeds a predetermined degree, it is forced to open automatically against its own weight and keeps its full open position. This operation is achieved by a repelling force which is accumulated by the gas chamber when it is compressed upon closing of the door. Thus, in a cold season such as winter, there may occur a problem in that the gas volume in the gas chamber reduces considerably as compared with that in other seasons, thereby lowering the repelling force, so that the desirable operation of the gas spring is not achieved. In fact, it sometimes happens that the door closes spontaneously by its own weight after the door is manually opened to the fully open position.

SUMMARY OF THE INVENTION

Therefore, it is an essential object of the present invention to provide a gas spring which is free of the above-mentioned problem.

According to the present invention, there is provided a gas spring which comprises a cylinder, a piston axially slidably received in the cylinder to divide the interior of the cylinder into first and second chambers, a piston rod connected at its one end to the piston and extending therefrom through the second chamber to project axially outwardly from the cylinder, first means for providing a passage between the first and second chambers only when the piston moves in a direction to contract the second chamber, second means for providing a passage between the first and second chambers only when the piston rod is pushed in a direction against the piston by a force greater than a predetermined degree, and third means for providing a passage between the first and second chambers only when the piston is positioned within a predetermined area in the cylinder.

BRIEF DESCRIPTION OF THE DRAWINGS

The features and advantages of the present invention will become clear from the following description when taken in conjunction with the accompanying drawings, in which.

DETAILED DESCRIPTION OF THE INVENTION

Figure 1:
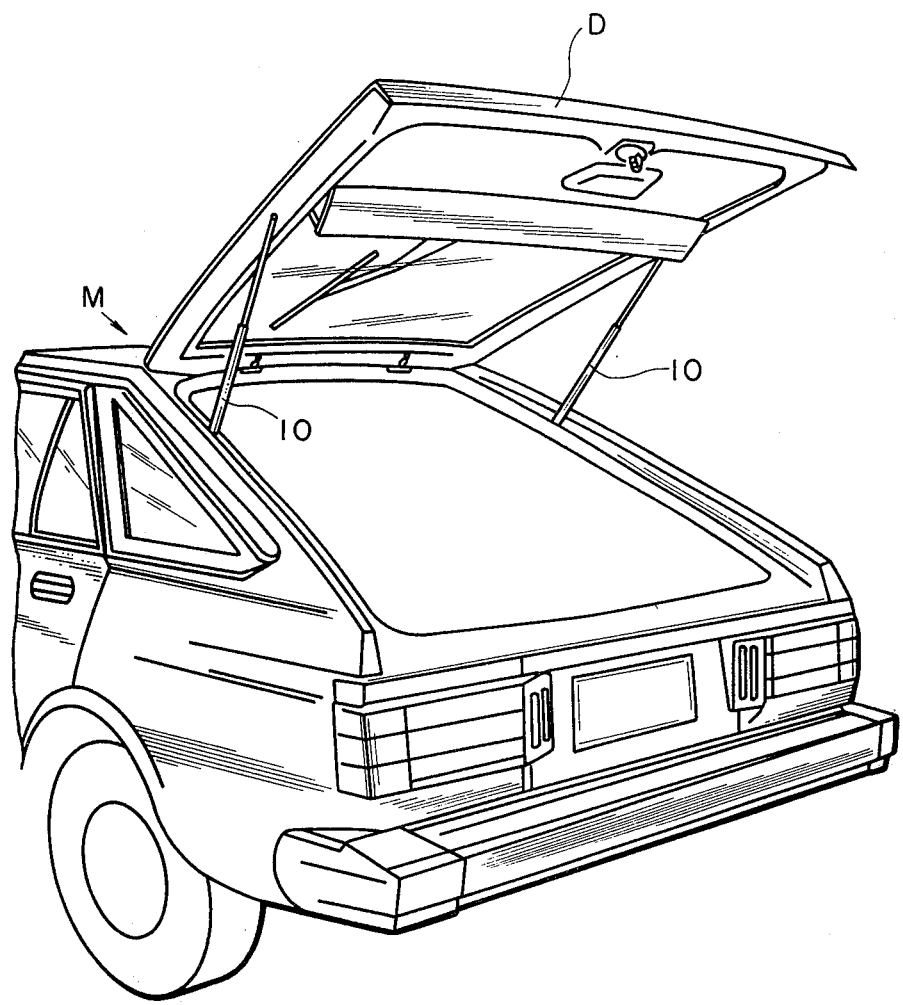
FIG. 1 is a rear view of a motor vehicle having a hatch type door which employs gas springs according to the present invention.

In FIG. 1, there is illustrated a rear view of a motor vehicle M having a hatch type door D which is hinged to the vehicle body. Two gas springs 10 according to the present invention are mounted to the vehicle M.

Figure 2:
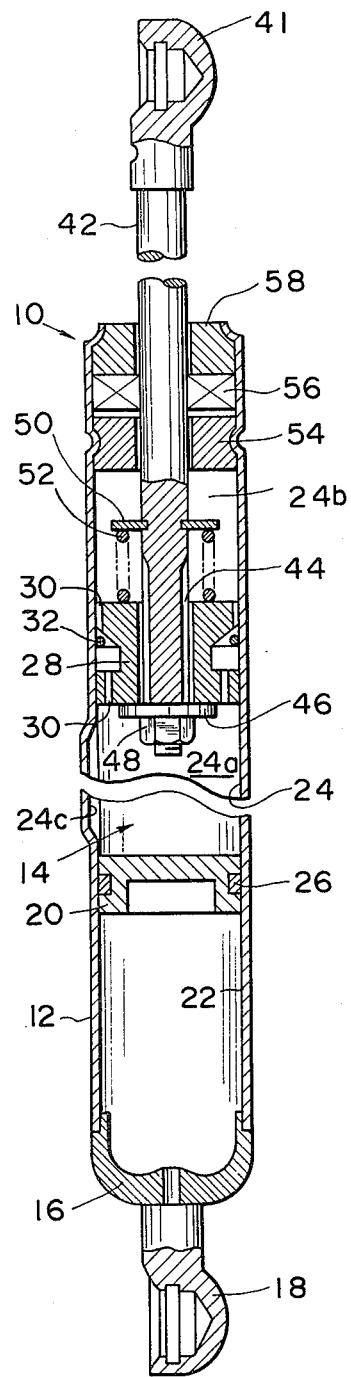
FIG. 2 is a sectional view of a gas spring according to the present invention.

Referring to FIG. 2, there is shown the gas spring 10 of the pesent invention. The gas spring 10 comprises a cylinder body 12 having a cylindrical chamber 14 formed therein. An open end of the cylinder body 12 is plugged with a cap member 16 to which a joint member 18 is fixed. The joint member 18 is pivotally connected to its counterpart (not shown) mounted on the vehicle body for achieving pivotal movement of the gas spring 10 relative to the vehicle body. A free-piston 20 is axially slidably and sealingly received in the cylindrical chamber 14 to divide the same into a gas chamber 22 and a liquid chamber 24. Within the gas chamber 22 is contained a highly compressed gas, such as a nitrogen gas, while within the liquid chamber 24 is contained a working liquid. An O-ring 26 is mounted to the free-piston 20 to assure isolation between these two chambers 22 and 24. A main piston 28 is axially slidably received in the liquid chamber 24 to divide the same into first and second liquid chamber sections 24a and 24b. The cylinder body 12 is slightly expanded at a portion defining the first liquid chamber section 24a to provide an axially extending groove 24c merged with the section 24a. The main piston 28 is formed with a first orifice means 30 which can provide a communication between the first and second liquid chamber sections 24a and 24b. As will become clear from the following description, the first orifice means 30 is closable by an O-ring 32.

Figure 3:
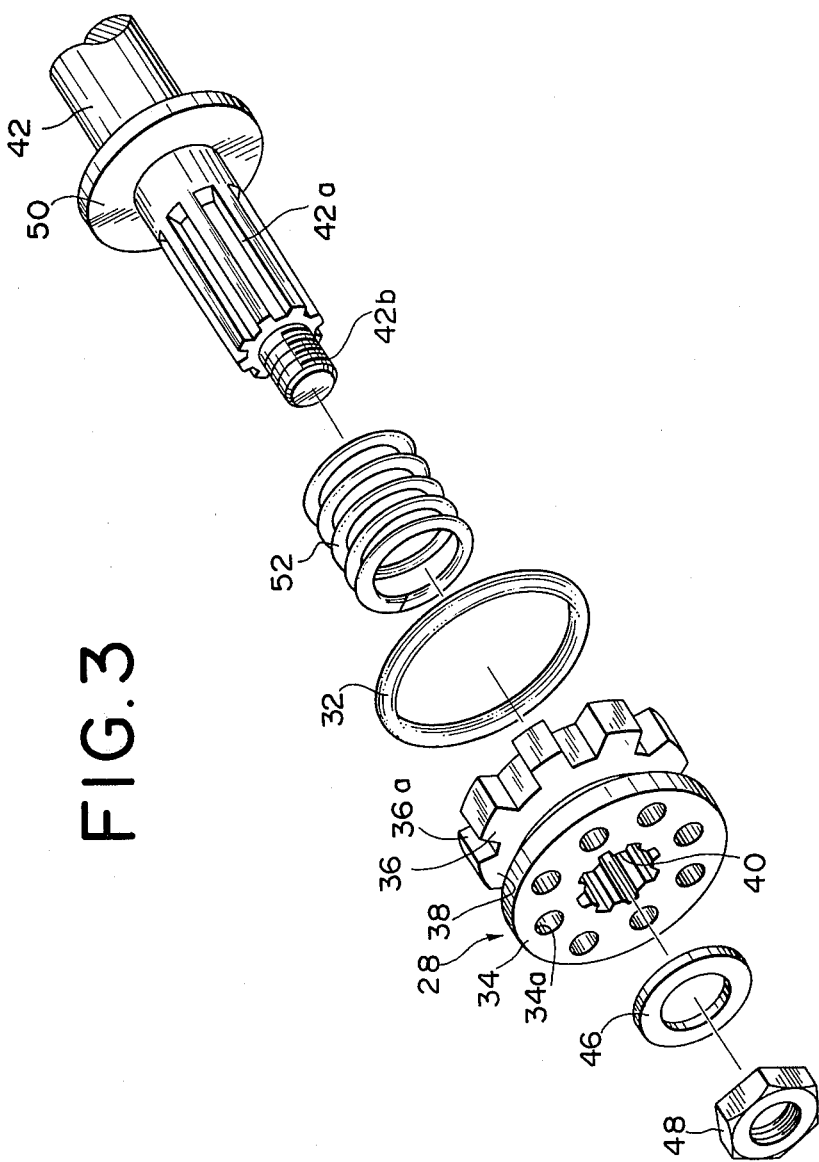
FIG. 3 is an exploded view of an essential portion of the gas spring of the present invention.

As is clearly shown in FIG. 3, the main piston 28 is formed with axially spaced first and second land portions 34 and 36 between which a port portion 38 is formed. The first land portion 34 is formed with a plurality of equally spaced openings 34a which communicate the first liquid chamber section 24a (see FIG. 2) with the port portion 38, and the second land portion 36 is formed with a plurality of axially extending grooves 36a which communicate the port portion 38 with the second liquid chamber section 24b (see FIG. 2). Thus, it will be seen that the openings 34a, the port portion 38 and the grooves 36a constitute the above-mentioned first orifice means 30. The O-ring 32 is loosely coupled in the port portion 38, but it is capable of closing the grooves 36a when brought into contact with the second land portion 36.

The main piston 28 is formed with a splined center hole 40 into which a splined base portion 42a of a piston rod 42 is axially movably received. As is seen from FIG. 2, the piston rod 42 extends axially outwardly from the cylinder body 12 and terminates at a portion to which a joint member 41 is fixed. The joint member 41 is pivotally connected to its counterpart (not shown) mounted on the hinged door D for achieving pivotal movement of the gas spring 10 relative to the door D. The spline connection between the hole 40 of the main piston 28 and the base portion 42a of the piston rod 42 is loosely made so as to define a second orifice means 44 which can provide a communication between the first and second liquid chamber sections 24a and 24b. As will become clear as the description proceeds, the second orifice means 44 is also closable by an annular valve member 46. The base portion 42a of the piston rod 42 is formed at its axially extream end with a threaded bolt portion 42b which is projected into the first liquid chamber section 24a when the base portion 42a is properly held in the splined hole 40 of the main piston 28.

As will be seen from FIG. 2, a nut 48 is secured to the bolt portion 42b for holding the annular valve member 46 between the nut 48 and the main piston 28. An annular spring seat 50 is securely mounted on the piston rod 42 at a position within the second liquid chamber section 24b. A coil spring 52 is compressed between the spring seat 50 and the main piston 28 so as to bias the piston 28 toward the nut 48, that is, in a direction to allow the annular valve member 46 to assume its close position.

A stopper member 54 for the spring seat 50, a sealing member 56 for sealing the second liquid chamber section 24b and a guiding bush 58 for the piston rod 58 are stationarily held in the other open end of the cylinder body, in a manner as best shown in FIG. 2.

Operation of the gas spring 10 will be described with reference to the drawings, especially FIGS. 4A to 4D. For easy understanding of the operation, the explanation of it will be made in accordance with the movement of the hinged door D to which the gas spring 10 is connected.

Figure 4A:
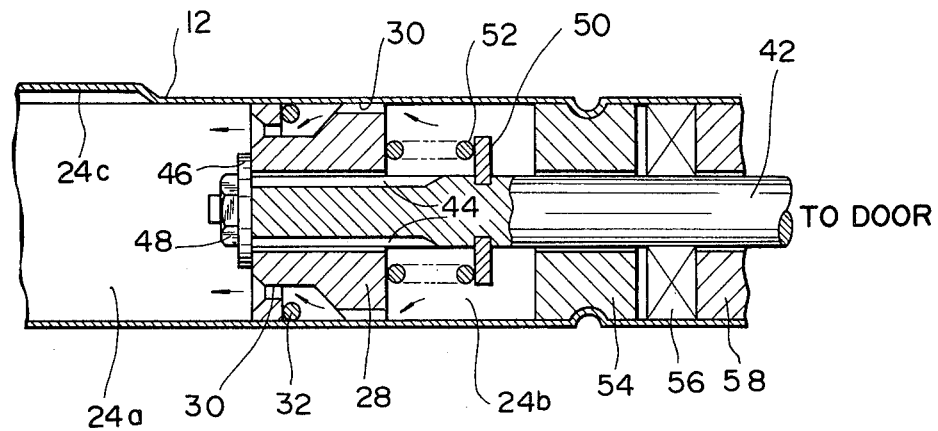
FIGS. 4A, 4B, 4C and 4D are partial enlarged sectional views of the gas spring of the invention, respectively showing operating conditions of the gas spring.

When the door D is under opening operation and comes into a position where the door D is almost full opened, the gas spring 10 shows a state as depicted by FIG. 4A. As will be seen from this drawing, as the hatch door D is moved to its full open position, the piston rod 42 moves rightward together with the main piston 28. During the rightward (or upward in actual use) movement of the piston 28, the O-ring 32 opens the first orifice means 30 causing the working liquid in the second liquid chamber section 24b to flow into the first liquid chamber section 24a as indicated by arrows. However, during this movement, the annular valve member 46 is kept closing the second orifice means 44 by the action of the biasing force applied thereto by the spring 52 and the liquid pressure in the reducing second liquid chamber section 24b. Thus, at the final stage of the opening operation of the hatch door D, it is compelled to move slowly.

Figure 4B:
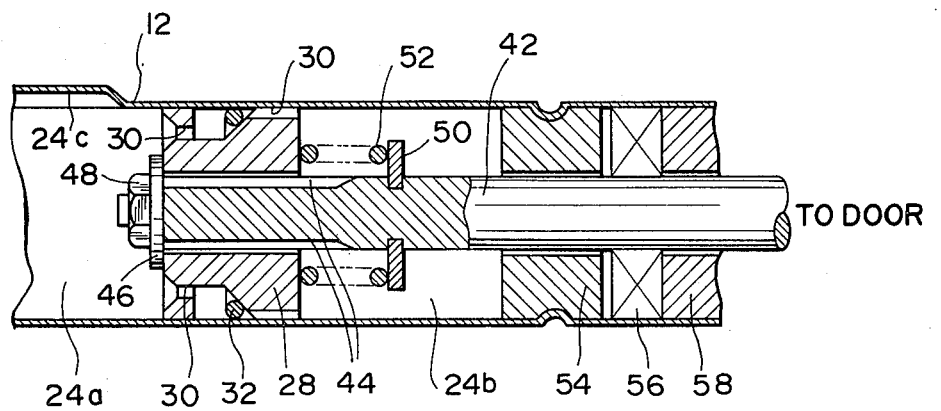
Figure 4C:
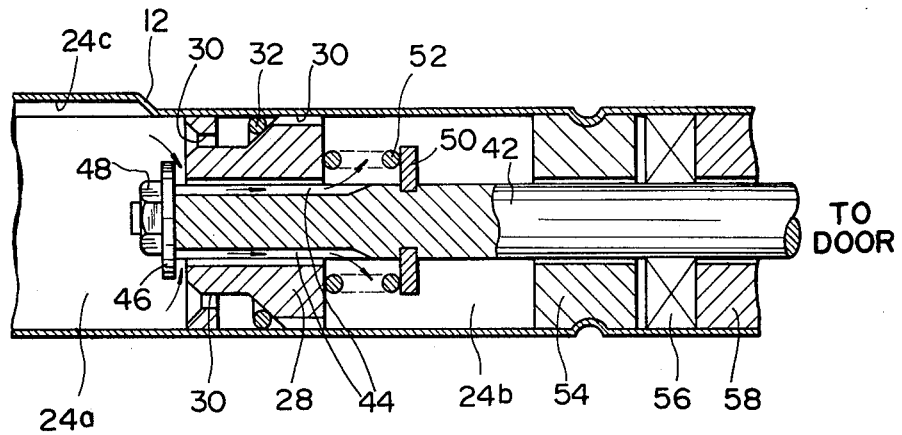

When the hatch type door D is swung up to its full open position, it begins closing movement by its own weight. In this initial stage of the closing movement of the door D, the gas spring 10 shows a state as depicted by FIG. 4B. As will be seen from this drawing, with the door D beginning to close, the piston rod 42 moves slightly in the leftward direction inducing a slight leftward movement of the main piston 28 by the action of the spring 52. Thus, in this condition, the O-ring 32 comes into contact with the second land portion 36 of the main piston 28 thereby to block the first orifice means 30. Further in this condition, the annular valve member 46 keeps its close position by the action of the biasing spring 52 and the liquid pressure in the second liquid chamber section 24b. With these manners, the first and second liquid chamber sections 24a and 24b becomes isolated from each other. With no passage between these sections, the leftward movement (or downward movement in actual use) of the main piston 28 and thus that of the piston rod 42, which would be induced by the weight of the door D, are stopped. Thus, the door is left at the substantially full open position. Now, it is to be noted that keeping the door D in its full open position is assuredly made irrespective of condition of the gas chamber 22. Thus, the above-mentioned problem encountered in the conventional gas spring does not occur.

When, in order to close the door D, an external force greater than a predetermined degree is applied to the door D, it begins closing movement. With this, as will be seen from FIG. 4C, a leftward displacement of the piston rod 42 relative to the main piston 28 occurs thereby to open the second orifice means. Thus, during the closing movement of the door D, the piston rod 42 and thus the main piston 28 moves leftward allowing the working liquid in the first liquid chamber section 24a to flow into the second liquid chamber section 24b as indicated by arrows. Thus, the closing movement of the door D is smoothly made.

Figure 4D:
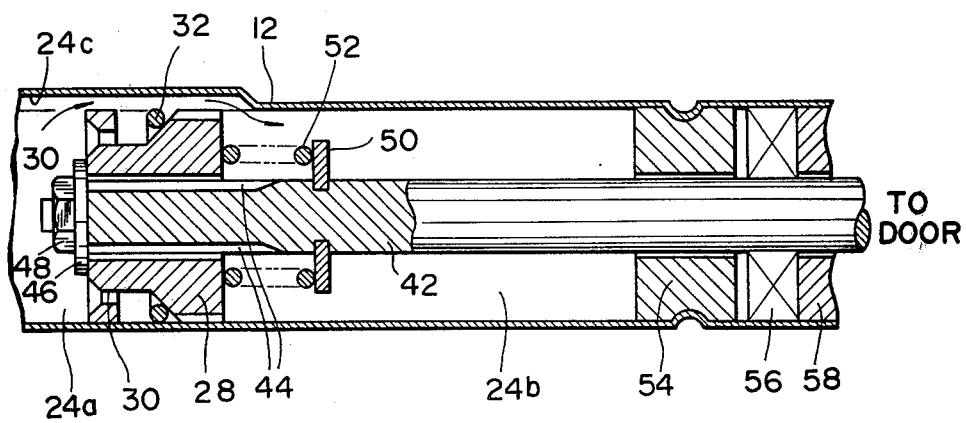

When, now, the door D comes into a position where the door D is almost full closed, the gas spring 10 shows a state as depicted by FIG. 4D. In this condition, the main piston 28 comes to the area where the axially extending groove 24c is located. With the groove 24c thus communicating the first and second liquid chamber sections 24a and 24b, the main piston 28 is leftwardly shifted and brought into contact with the annular valve member 46 to close the second orifice means 44 by the action of the spring 52. Thus, during the closing movement of the door D at its final stage, the main piston 28 moves leftward together with the piston rod 42 causing the working liquid in the first liquid chamber section 24a to flow into the second liquid chamber section 24b as indicated by arrows. It is to be noted that the final stage closing movement of the door D can be quickly made if the groove 24c has a larger size.

As has been mentioned hereinabove, since the gas spring 10 according to the present invention is constructed to have a state, as depicted by FIG. 4B, in which two liquid chamber sections 24a and 24b divided by a piston 28 to which a piston rod 42 is connected are isolated from each other, the door D can keep its full open position irrespective of the condition of the gas chamber 22. Thus, the before-mentioned problem encountered in the conventional gas spring originating from the pressure shortage in the gas chamber in a cold season does not occur in the present invention.

Although, in the above, description is made with respect to a construction having a free-piston 20 by which the gas chamber 22 and the liquid chamber 24 are bounded, it is also available to fill the entire of the cylinder proper 12 with a compressed gas without using such free-piston. In this construction, similar function to that mentioned above is achieved as will be easily understood by those skilled in the art.

What is claimed is:

1. A gas spring comprising:
   a cylinder;
   a free piston axially slidably and sealingly received in said cylinder to divide the interior of said cylinder into a gas chamber and a working liquid chamber;
   a piston axially slidably received in said working liquid chamber to divide the same into first and second working liquid chamber sections, the first section being located in the vicinity of said gas chamber;

a piston rod connected at its one end to said piston and extending therefrom through said second working liquid chamber section to project axially outwardly from said cylinder;

a first valve means for providing a passage between said first and second working liquid chamber sections only when said piston moves in a direction to contract said second working liquid chamber section;

a second valve means for providing a passage between said first and second working liquid chamber sections only when said piston moves in a direction to contract said first working liquid chamber section; and a third means for providing an additional passage when said piston is positioned in a predetermined area near said gas chamber, wherein said second means is constructed to form the passage between said first and second working liquid chamber sections when said piston rod is pushed toward said gas chamber to provide a displacement thereof relative to said piston.

2. A gas spring as claimed in claim 1, in which said second valve means comprises:

an axially extending through hole formed in said piston and loosely receiving therein the end of said piston rod so as to provide a clearance between the hole wall of said piston and said end thereby permitting the relative displacement of said piston rod relative to said piston, the end of said piston rod being projected into said first working liquid chamber section through said hole to form a projected section;

stopper means fixed to said projected section to limit the displacement of said piston rod relative to said piston in a direction away from said gas chamber;

a valve member arranged between said stopper means and said piston, said valve member having a side to close said hole of said piston; and biasing means for biasing said piston rod relative to said piston in the direction away from said gas chamber thereby biasing said valve member to close said hole of said piston.

3. A gas spring as claimed in claim 2, in which said valve member comprises an annular valve member disposed on said projected section of the piston rod.

4. A gas spring as claimed in claim 3, in which said biasing means comprises a spring seat secured to said piston rod at a position located in said secondary working liquid chamber section, and a spring compressed between said spring seat and said piston.

5. A gas spring as claimed in claim 4, in which both said hole of the piston and said end of the piston rod are splined so as to achieve a spline connection therebetween.

6. A gas spring as claimed in claim 5, in which said first means comprises a plurality of passages formed in said piston to provide a communication between said first and second working liquid chamber sections, and a valve member which closes said passages only when said piston moves in the direction toward said gas chamber.

7. A gas spring as claimed in claim 6, in which each of said passages comprises an opening formed in a first land portion of said piston, an axially extending groove formed in a second land portion of said piston, and a port portion formed between said first and second land portions, and in which said valve member comprises an O-ring loosely coupled in said port portion, said O-ring being capable of closing each groove when it is brought into contact with said second land portion.

8. A gas spring as claimed in claim 7, in which said third means is an axially extending groove formed at the interior wall of said cylinder.

9. A gas spring comprising a cylinder, a piston axially slidably received in said cylinder to divide the interior of the cylinder into first and second chambers, a piston rod connected at its one end to said piston and extending therefrom through said second chamber to project axially outwardly from said cylinder, first means for providing a communication between said first and second chambers only when said piston moves in a direction to contract said second chamber, second means for providing a communication between said first and second chambers only when said piston rod is pushed toward said first chamber against said piston by a force greater than a predetermined degree, and third means for providing a communication between said first and second chambers only when said piston is positioned in a predetermined area in said cylinder, wherein said first means comprises a plurality of passages formed in said piston to provide a communication between said first and second chambers, and a valve member which closes said passages only when said piston moves in the direction to contract said first chamber, each of said passages comprising an opening formed in a first land portion of said piston, an axially extending groove formed in a second land portion of said piston, and a port portion formed between said first and second land portions, and said valve member comprising an O-ring loosely disposed in said port portion, said O-ring being capable of closing said groove when it is brought into contact with said second land portion.

10. A gas spring comprising a cylinder, a piston axially slidably received in said cylinder to divide the interior of the cylinder into first and second chambers, a piston rod connected at its one end to said piston and extending therefrom through said second chamber to project axially outwardly from said cylinder, first means for providing a communication between said first and second chambers only when said piston moves in a direction to contact said second chamber, second means for providing a communication between said first and second chambers only when said piston rod is pushed toward said first chamber against said piston by a force greater than a predetermined degree, and third means for providing a passage between said first and second chambers only when said piston is positioned in a predetermined area in said cylinder, wherein said second means comprises an axially extending through hole formed in said piston and loosely receiving therein the end of said piston rod so as to provide not only a clearance between the hole wall of said piston and said end but also a relative displacement between said piston and said piston rod, the end of said piston rod being projected into said first chamber through said hole to form a projected section, stopper means fixed to said projected section to limit the displacement of said piston rod relative to said piston in a direction away from said first chamber, a valve member arranged between said stopper means and said piston, said valve member having a size to close said hole of said piston, and biasing means for biasing said piston rod to move relative to said piston in the direction away from said first chamber thereby biasing said valve member to close said hole of the piston.

11. A gas spring as claimed in claim 10, in which said valve member comprises an annular valve member disposed on said projected section of the piston rod.

12. A gas spring as claimed in claim 11, in which said biasing means comprises a spring seat secured to said piston rod at a position located in said second chamber, and a spring compressed between said spring seat and said piston.

13. A gas spring as claimed in claim 12, in which both of said hole wall of the piston and said end of said piston rod are splined so as to achieve a spline connection therebetween.

14. A gas spring as claimed in claim 10, in which said third means is an axially extending groove formed at the interior wall of said cylinder.

* * * * *